No. 619,634. Patented Feb. 14, 1899.
W. G. THOMSON.
FLOOR CLOTH MACHINE.
(Application filed Aug. 5, 1898.)
(No Model.) 7 Sheets—Sheet 4.
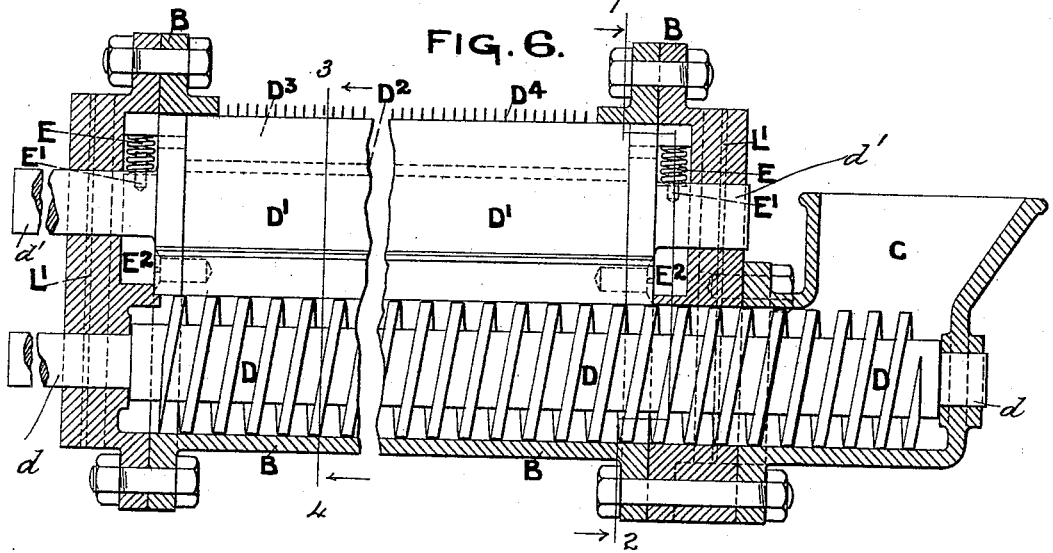
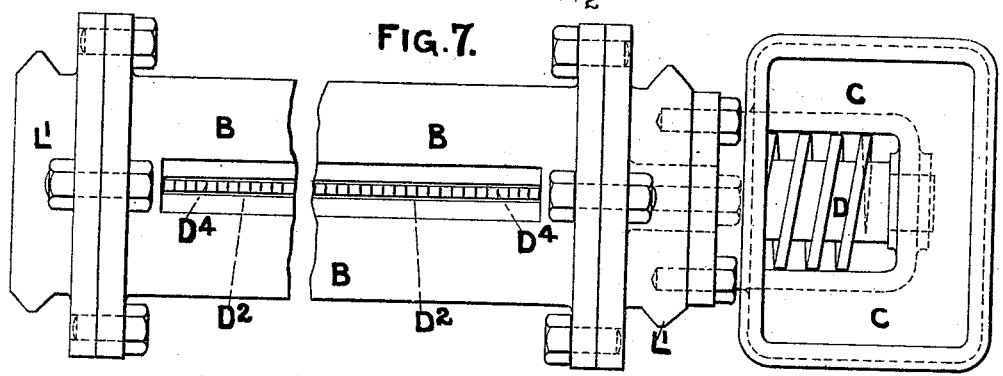
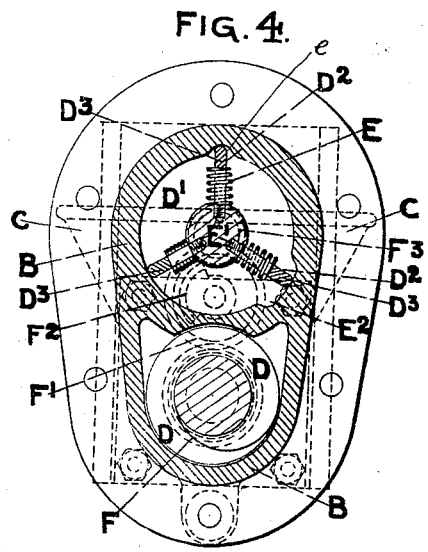
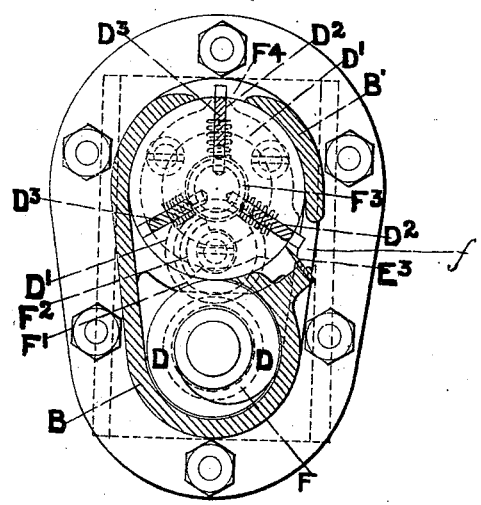
Witnesses
Abm Reed
Willie Dean
Inventor
Wallace Gabry Thomson No. 619,634. Patented Feb. 14, 1899.
W. G. THOMSON.
FLOOR CLOTH MACHINE.
(Application filed Aug. 5, 1898.)
(No Model.) 7 Sheets—Sheet 5.

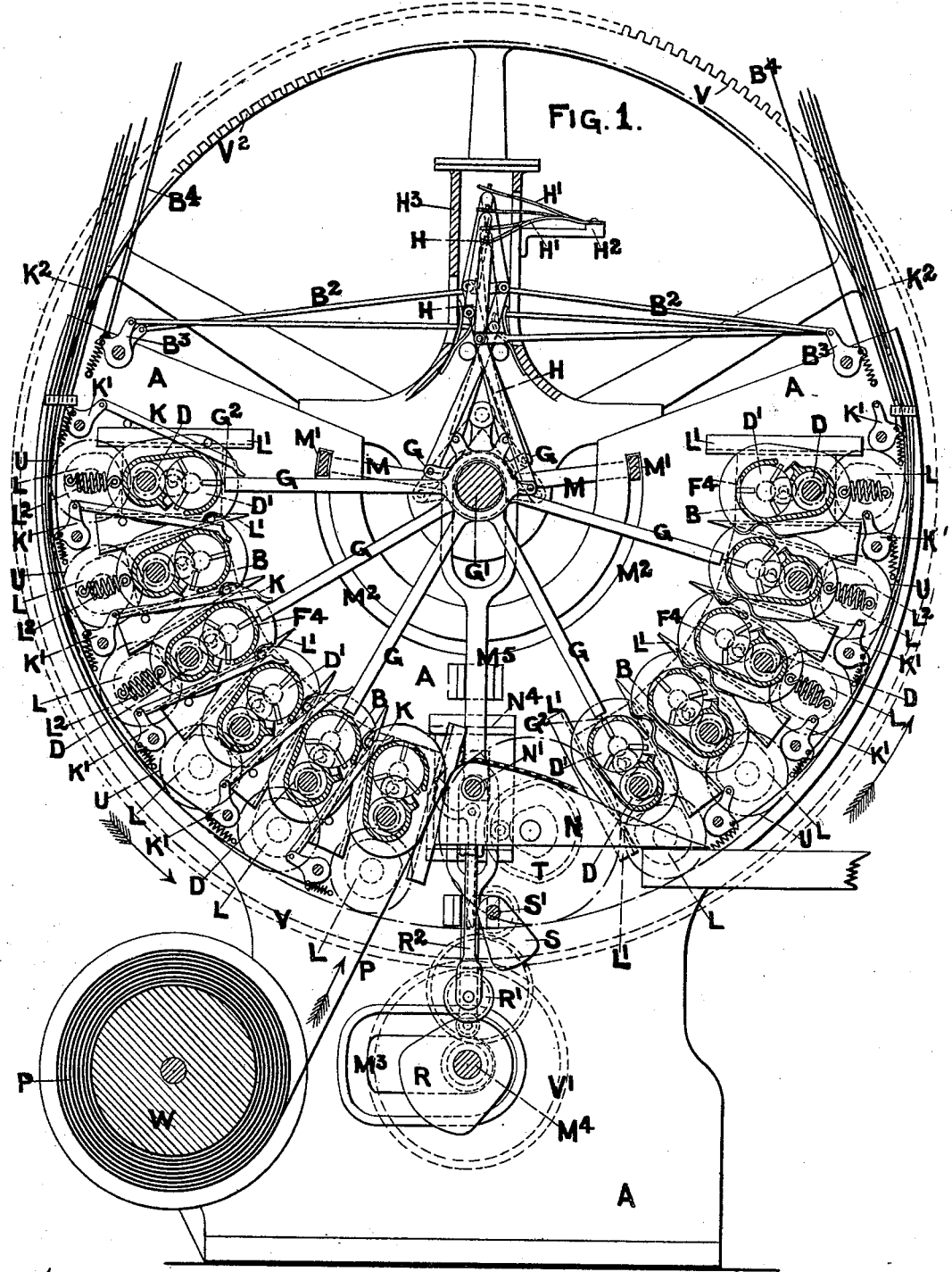

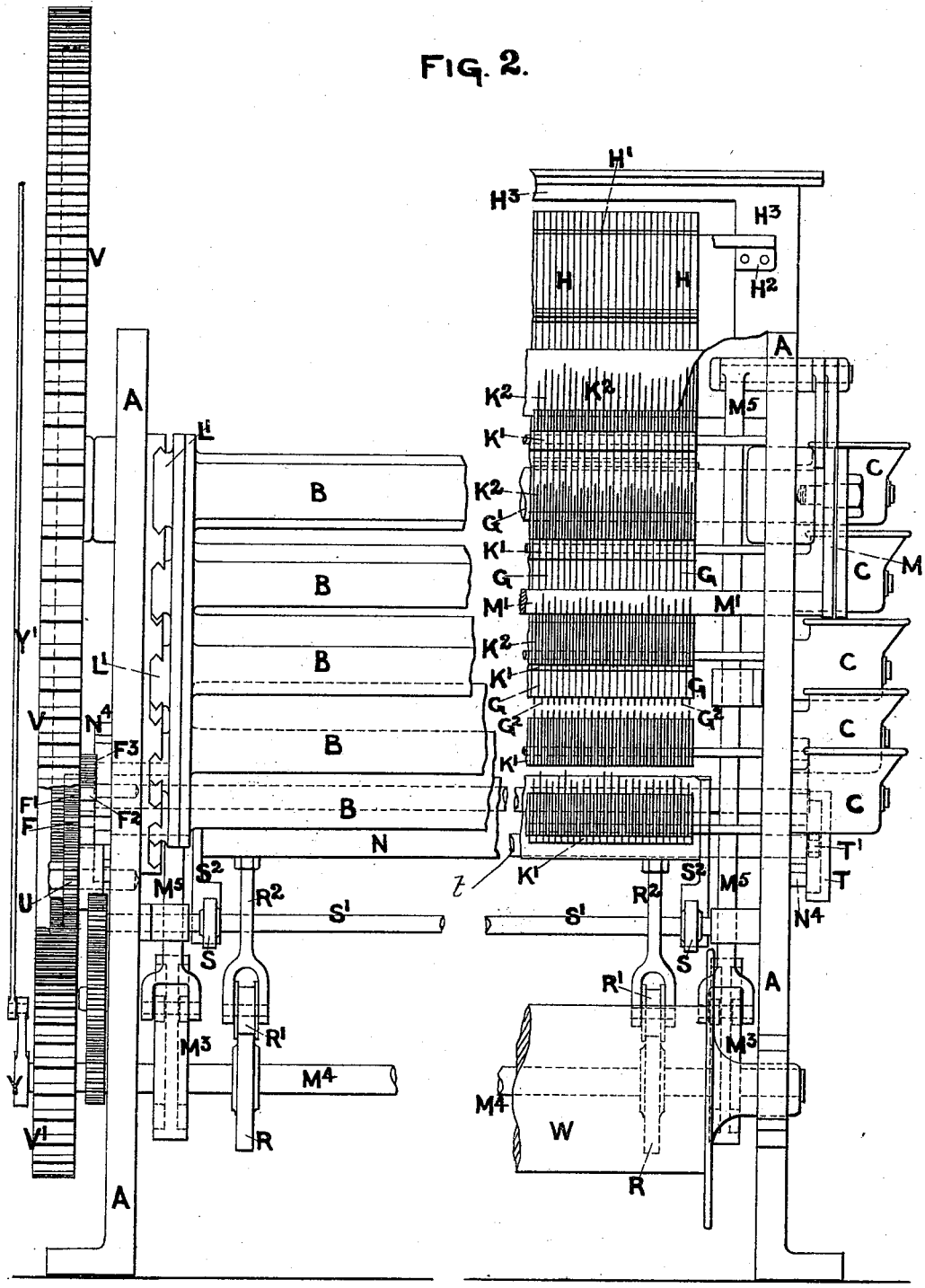

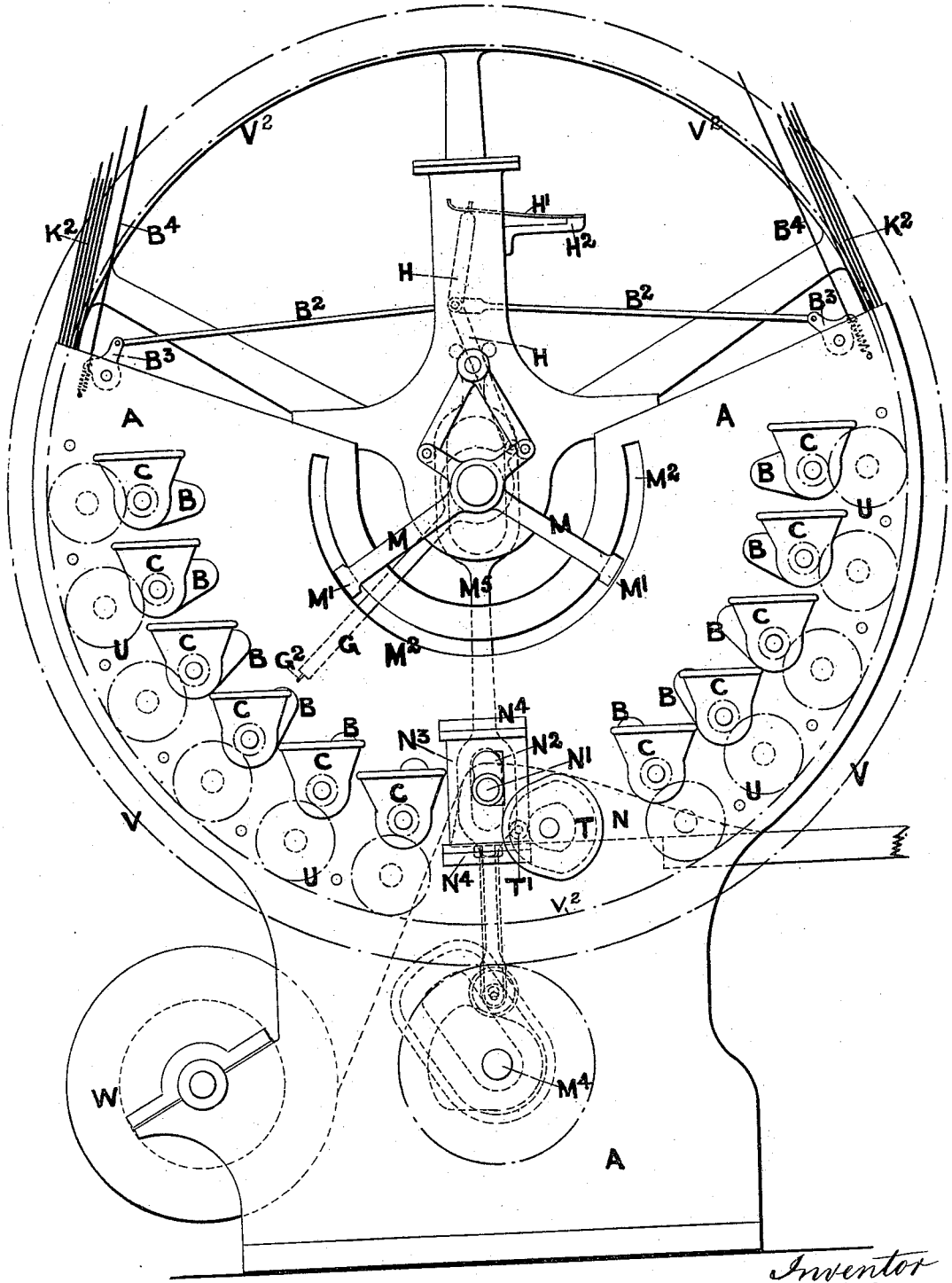

Witnesses
Abm Reed
Willie Dean

Inventor
Wallace Galry Thomson

No. 619,634. Patented Feb. 14, 1899.
W. G. THOMSON.
FLOOR CLOTH MACHINE.
(Application filed Aug. 5, 1898.)

(No Model.) 7 Sheets—Sheet 6.

Witnesses
Abm Reed
Willie Dean

Inventor
Wallace Galey Thomson

No. 619,634. Patented Feb. 14, 1899.
W. G. THOMSON.
FLOOR CLOTH MACHINE.
(Application filed Aug. 5, 1898.)
(No Model.) 7 Sheets—Sheet 7.

WITNESSES
INVENTOR
Wallace G. Thomson
by Herbert W. T. Jenner
Attorney

UNITED STATES PATENT OFFICE.

WALLACE GALREY THOMSON, OF SELBY, ENGLAND.

FLOOR-CLOTH MACHINE.

SPECIFICATION forming part of Letters Patent No. 619,634, dated February 14, 1899.

Application filed August 5, 1898. Serial No. 687,861. (No model.)

*To all whom it may concern:*

Be it known that I, WALLACE GALREY THOMSON, residing at Selby, in the county of York, England, have invented certain new and useful Improvements in Linoleum or Floor-Cloth Machines, of which the following is a specification.

This invention relates to machines for making inlaid linoleums and other floor-cloths; and it consists in the novel construction and combination of the parts hereinafter fully described and claimed.

Figure 8:
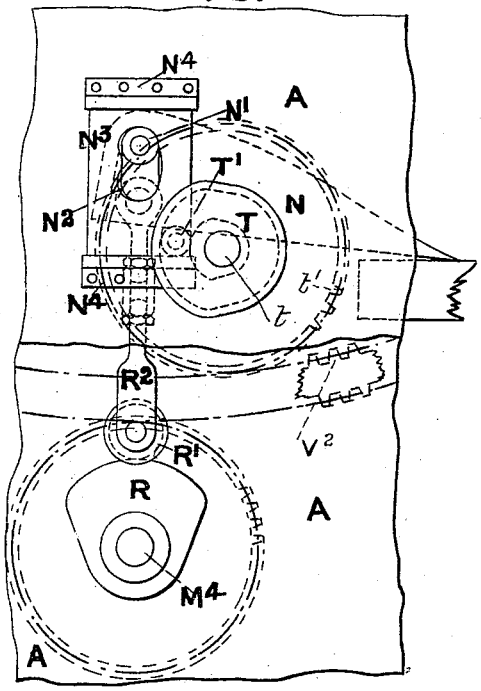
Figure 9:
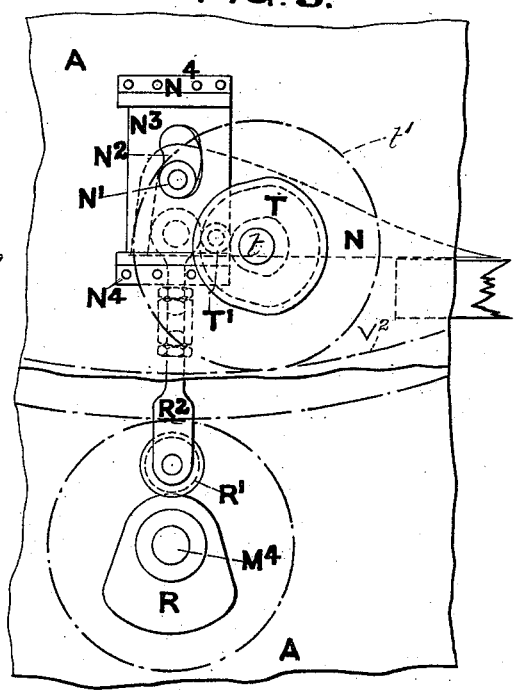
Figure 10:
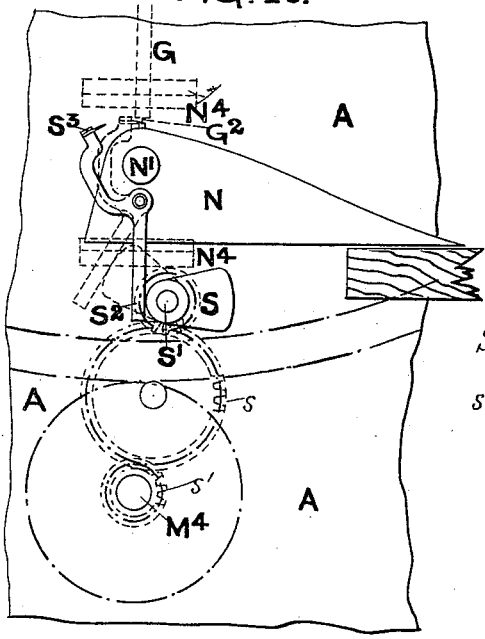
Figure 11:
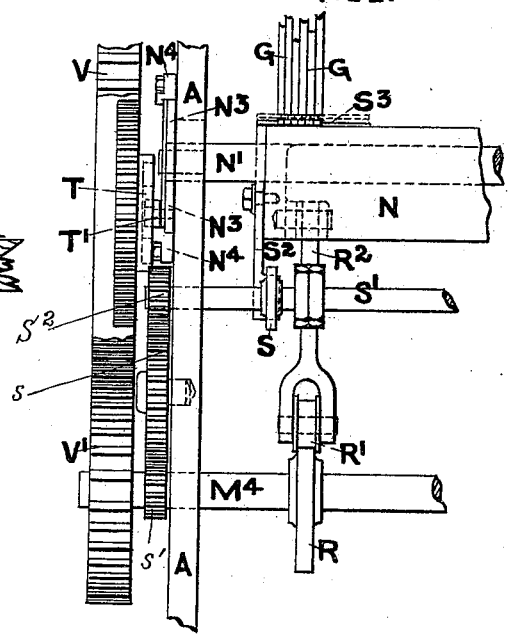
Figure 12:
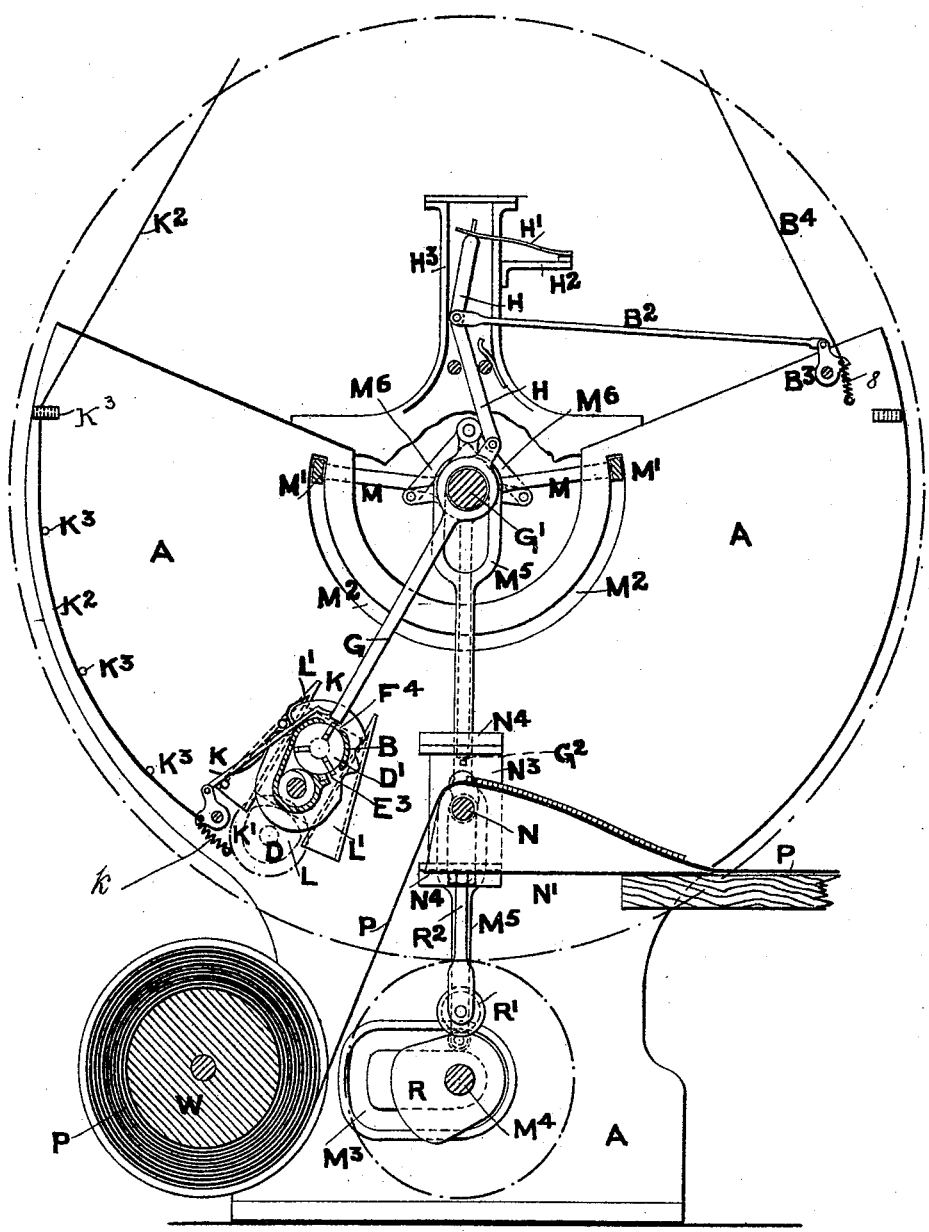
Figure 13:
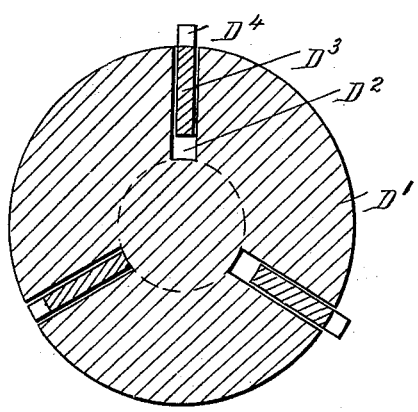
Figure 14:
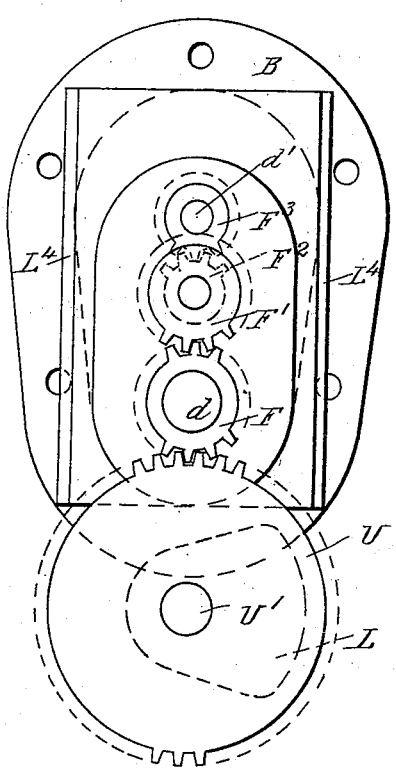
Figure 15:
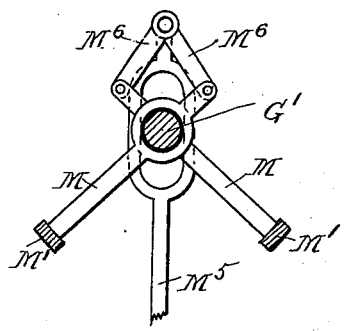
Figure 16:
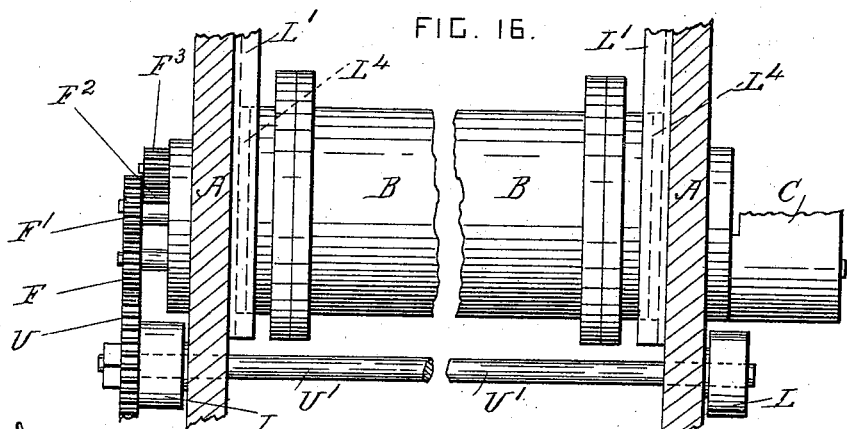

In the drawings, Figure 1 is a cross-section through the machine. Fig. 2 is a side view with some of the parts removed and broken away for clearness. Fig. 3 is an end view showing the feed-hoppers. Figs. 4 and 5 are cross-sections through one of the linoleum-containers, taken on the lines 1 2 and 3 4, respectively, in Fig. 6. Fig. 6 is a longitudinal section through one of the linoleum-containers. Fig. 7 is a plan view of the same. Figs. 8 and 9 are detail side views showing the means for operating the table in the raised and lowered positions of the table, respectively. Figs. 10 and 11 are respectively an end view and a partial side view of the stripping mechanism. Fig. 12 is a side view of one arm G and one stop K and their operating devices, showing also one container in section and the various parts coöperating with it. Fig. 13 is a detail cross-section through one of the rollers D'. Fig. 14 is an end view of one container and the mechanism for operating it. Fig. 15 is a detail side view of the connections between one of the rods $M^5$ and the collecting-bars. Fig. 16 is a front view of one of the containers, showing its supports and the means for operating it.

A is a frame of any approved construction, and G' is a main shaft carried by brackets $H^3$, secured to the frame.

$M^4$ is the driving-shaft of the machine, journaled in the lower part of the frame and revolved by any approved means. (Not shown.)

V is an external toothed wheel carried by the main shaft and driven by a toothed pinion V', carried by the driving-shaft.

$V^2$ is an internal toothed wheel formed integral with the wheel V.

U are toothed wheels secured on shafts U', journaled in the frame A. The wheels U are arranged in a series equidistant from the main shaft, and they gear into the wheel $V^2$.

L are cams secured on the shafts U' for operating the containers.

The containers B are arranged in a series on a curve and are slidable radially of the main shaft, as shown in Fig. 1. As the containers and the collecting and depositing mechanisms coöperating with them are all alike, the description will be confined to one of them, as shown in Fig. 12.

The container has slides $L^4$ at its ends, which are slidable radially in guides L', secured to the frame A, and are moved toward the shaft by a cam L and away from it by springs $L^2$ or by gravity. (See Fig. 1.)

Each container holds a different color of linoleum in the form of paste, and the material is introduced through the hopper C at one end of the machine.

D is a screw conveyer journaled in the lower part of the container, and $d$ is its shaft. Above the conveyer is a roller D', the shaft $d'$ of which is journaled in bearings at the ends of the container, (see Fig. 6,) and $D^2$ are three longitudinal slots formed in the roller. $D^3$ are spring-pressed bars which slide radially in the said slots, and $D^4$ are knives mounted on the said bars and forming the molds for the tesseræ or cubes of linoleum.

E are the springs, interposed between the shaft $d'$ and the ends of the bars, and E' are guide-pins for the springs. The end portions of the container have recesses $e$ and $E^2$ at the top and at one side, respectively, and the springs project the bars into these recesses when they come opposite to them.

$F^4$ is an opening at the top of the container, and $f$ is an opening at its side. The plastic material is forced by the screw conveyer into the molds when the said molds are opposite the conveyer. The conveyer is driven by a toothed wheel F on the end of its shaft, which gears into the wheel U. (See Fig. 14.) The wheel F gears into a toothed wheel F', mounted on a pin which projects from the end of the container, and the wheel F' drives the toothed segment $F^2$, mounted concentric with it. The toothed segment gears into a toothed wheel $F^3$ on the shaft $d'$ of the roller D', and when the said roller has three slots the parts are so proportioned that it revolves one-third of a revolution and then stops while the conveyer is turning the remaining portion of the revolution. This enables the conveyer to pack the material into the mold presented to it.

The tesseræ are removed for use in making floor-cloth when the mold projects at the opening at the top of the container, as shown in Fig. 5. The superfluous tesseræ not then removed are discharged from the mold by a toothed scraper $E^3$ when the mold projects through the opening $f$ and are disposed of in any convenient manner.

The tesseræ required for use are collected and removed by a series of arms G, pivoted on the main shaft $G'$ and provided with needle-points $G^2$ at their free ends. When the arms are placed opposite the mold, which projects at the top of the container, the cams L move the container toward the shaft, so that the tesseræ are impaled on the needle-points. The wheel F is moved out of gear with the wheel U by the cams L, so that the roller $D'$ is not revolved while the tesseræ are being impaled, and the roller does not recommence to revolve until the continued motion of the cams L permits the springs to draw back the container to its original position. Each impalement arm is operated by toggle-levers H, pivoted to its upper end, a spring $H'$, and a rod $B^2$, connected to the joint of the toggle-levers. The spring $H'$ is carried by a cross-piece and arms $H^2$, secured to the brackets $H^3$. The rod $B^2$ is operated by a bell-crank $B^3$, pivotally-supported by the frame and moved back by a spring 8. The bell-crank is moved forward and controlled by a part $B^4$ of an extra harness attached to a jacquard mechanism similar to that of a loom. This jacquard mechanism (not shown) is of any approved construction and is preferably supported above the floor-cloth machine and is operated by a crank Y on the driving-shaft and a connecting-rod $Y'$. (See Fig. 2.)

K is a slidable stop-finger which is projected into the path of each arm when it arrives in front of the tessera to be impaled on it. The stop-finger is guided in any approved manner and is operated by a bell-crank $K'$, pivotally supported by the frame A. The bell-crank is moved to retract the finger by a spring $k$, and $K^2$ is a part of the ordinary harness of the jacquard mechanism, which is connected to the said bell-crank and which operates to project the stop-finger at the prearranged time. All the impalement-arms are operated and controlled by the jacquard mechanism in a similar manner, and the ordinary pattern-cards of the jacquard mechanism cause the impalement-arms to select and transfer tesseræ of different colors and enable the floor-cloth machine to make linoleums having designs similar to those of Axminster and other carpets. The harness is guided by any approved means, such as guides or guide-bars $K^3$, as shown to the left in Fig. 12.

$M'$ are collecting-bars extending across the machine and pivoted to the shaft $G'$ by arms M. These bars pass through curved slots $M^2$ in the frame. These bars collect all the impalement-arms and bring them to a vertical position after they have impaled the tesseræ. The collecting-arms are operated by rods $M^5$ and have their upper ends pivotally connected with the upper ends of the said rods by links $M^6$. (See Fig. 15.) The rods $M^5$ are raised and lowered periodically by cams $M^3$, secured on the driving-shaft, as shown in Figs. 2 and 12.

N is the table, which supports the textile backing P under the impalement-arms when vertical. The backing P is carried by a reel W and is fed through the machine by any approved mechanism for that purpose.

The table N is carried by a shaft $N'$, the ends of which are guided in curved slots $N^2$ formed in blocks $N^3$, which slide horizontally in guides $N^4$ on the frame. The table is raised intermittently by cams R, secured on the driving-shaft. These cams operate on rollers $R'$, carried by the lower ends of rods $R^2$, which are pivoted to the table, as shown in Fig. 11. When the table is being raised, the blocks $N^3$ are held stationary, and the curvature of the guide-slots constrains the table to move laterally toward the suspended tesseræ, thereby bringing the last row of tesseræ (see Fig. 12) into close contact sidewise with the row of tesseræ carried by the impalement-arms and ready to be deposited on the backing.

$S^3$ is a toothed stripping-comb carried by arms $S^2$, which are pivoted to the ends of the table. These arms are operated by cams S, secured on a shaft $S'$, which is journaled in the frame A. The shaft $S'$ is revolved by a toothed wheel $S^2$, which is connected with a toothed wheel $S'$ on the driving-shaft by means of an idle-wheel $s$. When the table is raised, the stripping-comb is brought to the position shown in dotted lines in Fig. 10, so that the tesseræ are stripped off the needle-points when the table descends and are deposited on the backing.

The table is preferably constrained to descend vertically, so as to prevent possible injury to the pattern, by means of cams T, which are secured on a shaft $t$, journaled in the frame and extending crosswise under the table. (See Fig. 2.) The shaft $t$ is driven by a toothed wheel $t'$, which gears into the internal toothed wheel $V^2$, and the cams engage with rollers $T'$, mounted on pins projecting from the ends of the table. The cams move the sliding blocks horizontally while the table is descending, so that the curvature of the guide-slots is neutralized and the tesseræ are stripped off the needle-points without being moved laterally. When the canvas backing has received the tesseræ, it may pass direct to a finishing-machine of any approved construction.

The action of the machine is as follows: The plastic linoleum from the hoppers is pressed into the molds as the latter pause over the conveyers, and the molds containing the tesseræ are subsequently protruded at the upper part of the containers by the springs carried by the rollers D'. The jacquard mechanism and harness operate to bring the impalement-arms over the tesseræ, according to the number and color of them required. The containers are then raised, so that the tesseræ are impaled and the containers are lowered. The collecting-bars then assemble the impalement-arms in a vertical position over the table and the table is raised. The stripping-comb is moved over the tesseræ, so that they are deposited on the backing as the table descends, and the cycle of operations is recommenced after each deposit of tesseræ.

What I claim is—

1. In a floor-cloth machine, the combination, with molds for forming tesseræ, of mechanism operating to transfer the tesseræ from the molds to a backing, a jacquard mechanism, and harness operated by the said jacquard mechanism and controlling the action of the said transferring mechanism, substantially as set forth.

2. In a floor-cloth machine, the combination, with a series of molds for forming tesseræ arranged in a curve, of a series of impalement-arms pivoted concentric of the said molds, mechanism operating to rock the said arms, a jacquard mechanism, and harness operated by the said jacquard mechanism and controlling the movements of the said arms, substantially as set forth.

3. In a floor-cloth machine, the combination, with a frame provided with guides, and a main shaft supported by the frame; of a series of containers slidable in the said guides and arranged in a curve and radial of the said shaft, cams for moving the containers toward the said shaft, and driving mechanism operating to revolve the cams simultaneously, substantially as set forth.

4. In a floor-cloth machine, the combination, with slidable containers arranged in a curve and upon radial lines, of cams for sliding the containers, and driving mechanism operating to revolve the cams simultaneously, substantially as set forth.

5. In a floor-cloth machine, the combination, with slidable containers arranged in a curve upon radial lines, of cams for sliding the containers, toothed wheels for revolving the cams, and an internal toothed wheel driving all the said wheels simultaneously, substantially as set forth.

6. The combination, with a container, of a screw conveyer revoluble therein, a roller provided with a longitudinal slot and also revoluble in the container, and a bar slidable in the said slot and provided with knives on its outer edge, said conveyer operating to press the material into the slot between the knives, thereby forming tesseræ, substantially as set forth.

7. The combination, with a roller provided with molds for tesseræ, a screw conveyer for filling the said molds arranged parallel with the said roller, and a container inclosing the said roller and screw conveyer; of toothed wheels and a toothed segmental wheel operatively connecting the said roller and screw conveyer and driving the roller intermittently from the screw conveyer, substantially as set forth.

8. The combination, with a container provided with an opening and recesses e adjacent thereto, of a roller revoluble in the container and provided with a slot, a bar provided with knives on its edge, and springs pressing the said bar outwardly in the said slot, whereby the knives are projected through the said opening when the ends of the said bar pass into the said recesses, substantially as set forth.

9. The combination, with a container provided with openings and recesses adjacent to the openings, of a roller revoluble in the container and provided with a slot, a bar provided with knives on its edge, springs pressing the said bar outwardly in the said slot and operating to project the knives through the openings when the ends of the said bar pass into the said recesses, and a scraper arranged in one of the said openings and operating to remove superfluous tesseræ from between the said knives, substantially as set forth.

10. In a floor-cloth machine, the combination, with a series of molds for tesseræ arranged in a curve, of a series of impalement-arms pivoted concentric of the said molds, means for placing the said arms opposite the molds, and driving mechanism operating to slide the molds toward the ends of the impalement-arms, whereby the tesseræ are impaled, substantially as set forth.

11. In a floor-cloth machine, the combination, with a mold for tesseræ, of a pivoted impalement-arm, means for placing the end of the impalement-arm opposite the mold, and means for moving one of the said parts toward the other and back again, thereby transferring a tessera from the mold to the arm, substantially as set forth.

12. In a floor-cloth machine, the combination, with a pivoted impalement-arm, of toggle-levers pivoted to the said arm, a spring bearing on the toggle-levers, and an operating-rod connected to the toggle-levers, substantially as set forth.

13. In a floor-cloth machine, the combination, with a mold for tesseræ, of a pivoted impalement-arm, means for turning the said arm on its pivot, and a retractable stop arranged in the path of the said arm and arresting its motion when it comes opposite the said mold, substantially as set forth.

14. In a floor-cloth machine, the combination, with a mold for tesseræ, of a pivoted impalement-arm, a retractable stop arranged in the path of the said arm, means for moving the said arm and stop, and harness operated by a jacquard mechanism and controlling the movement of the said arms and stop, substantially as set forth.

15. In a floor-cloth machine, the combination, with a shaft, and a series of impalement-arms pivoted thereon; of a collector-bar pivotally supported from the said shaft, and means for moving the said bar against the said arms and thereby placing them in alinement with each other, substantially as set forth.

16. In a floor-cloth machine, the combination, with a shaft, and a series of impalement-arms pivoted thereon; of two collector-bars pivotally supported from the said shaft and arranged at the ends of the series of arms, and means for moving the said bars toward each other simultaneously, thereby placing all the said arms in alinement, substantially as set forth.

17. In a floor-cloth machine, the combination, with a shaft, a series of impalement-arms pivoted thereon, and collector-bars arranged at the ends of the series of arms and provided with arms M which are pivoted on the said shaft; of an operating-rod, links extending in opposite directions and pivotally connecting the said rod with the arms M, and means for reciprocating the said rod, substantially as set forth.

18. In a floor-cloth machine, the combination, with means for suspending tesserae, of a table for supporting a backing, and lifting mechanism operating to move the table upward and to one side whereby the suspended tesserae are brought into contact sidewise with the tesserae previously deposited on the backing, substantially as set forth.

19. In a floor-cloth machine, the combination, with means for suspending tesserae, of a table for supporting a backing, means for raising the table, and guides operating to move the table laterally when being raised, substantially as set forth.

20. In a floor-cloth machine, the combination, with means for suspending tesserae, of a table for supporting a backing, means for reciprocating the table, and guide mechanism operating to constrain the table to move laterally as it moves toward the tesserae and to move in a straight line as it moves in the reverse direction, substantially as set forth.

21. In a floor-cloth machine, the combination, with means for suspending tesserae, of a movable table for supporting a backing, a stripping device pivoted to the table, and means for placing the stripping device over the tesserae after the table is raised, whereby the tesserae are deposited on the backing when the table descends, substantially as set forth.

22. In a floor-cloth machine, the combination, with a table for supporting a backing, and means for raising and lowering it; of stripper-arms pivoted to the said table, a stripping-comb carried by the said arms, cams operating the stripper-arms, a shaft for revolving the said cams, and stationary bearings supporting the said shaft, substantially as set forth.

23. In a floor-cloth machine, the combination, with a frame provided with guides, of blocks slidable in the said guides and provided with guide-slots, a table for supporting a backing and having its upward motion controlled by the said slots, means for raising and lowering the table, and driving devices for moving the said blocks laterally in the said guides when the table descends, substantially as set forth.

24. In a floor-cloth machine, the combination, with a series of molds for tesserae, and a table for supporting a backing; of a series of pivoted impalement-arms, means for moving the said arms outward opposite the molds and inward opposite the table, means for reciprocating the molds when the arms have been moved outward, means for reciprocating the table when the arms have been moved inward, and a stripping device for removing the tesserae from the said arms when the table moves away from them, whereby tesserae are transferred from the molds to the backing, substantially as set forth.

25. In a floor-cloth machine, the combination, with a series of molds for tesserae, and a table for supporting a backing arranged between the said molds; of a series of impalement-arms pivoted over the table, means for moving the said arms outward opposite the molds, collecting mechanism for moving the arms inward and alining them over the table, means for reciprocating the molds when the arms have been moved outward, means for reciprocating the table when the arms are in alinement, and a stripping device for removing the tesserae from the said arms when the table moves away from them, substantially as set forth.

In testimony whereof I hereunto affix my signature in the presence of two witnesses.

WALLACE GALREY THOMSON.

Witnesses:
ABM. REED,
WILLIE DEAN.